J. F. MERRELL.
CLEARING ATTACHMENT FOR RAKES.
APPLICATION FILED DEC. 12, 1914.

1,157,566.

Patented Oct. 19, 1915.
2 SHEETS—SHEET 2.

J. F. Merrell
Inventor

UNITED STATES PATENT OFFICE.

JOHN F. MERRELL, OF MARQUETTE, KANSAS.

CLEARING ATTACHMENT FOR RAKES.

1,157,566.

Specification of Letters Patent.

Patented Oct. 19, 1915.

Application filed December 12, 1914. Serial No. 876,853.

*To all whom it may concern:*

Be it known that I, JOHN F. MERRELL, a citizen of the United States, residing at Marquette, in the county of McPherson and State of Kansas, have invented a new and useful Clearing Attachment for Rakes, of which the following is a specification.

This invention relates to an attachment for use in connection with sweep rakes whereby hay or the like gathered by the rake can be forced readily therefrom simply by backing the draft animals attached to the rake.

A further object is to provide an attachment which will automatically assume its normal position on the rake while the said rake is being moved forwardly.

A further object is to provide an attachment of this character adjustable to rakes of different constructions.

Another object is to provide a rake attachment which is light, durable and efficient and can be applied readily to a rake without requiring the services of a skilled mechanic.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings, the preferred form of the invention has been shown.

Figure 1:
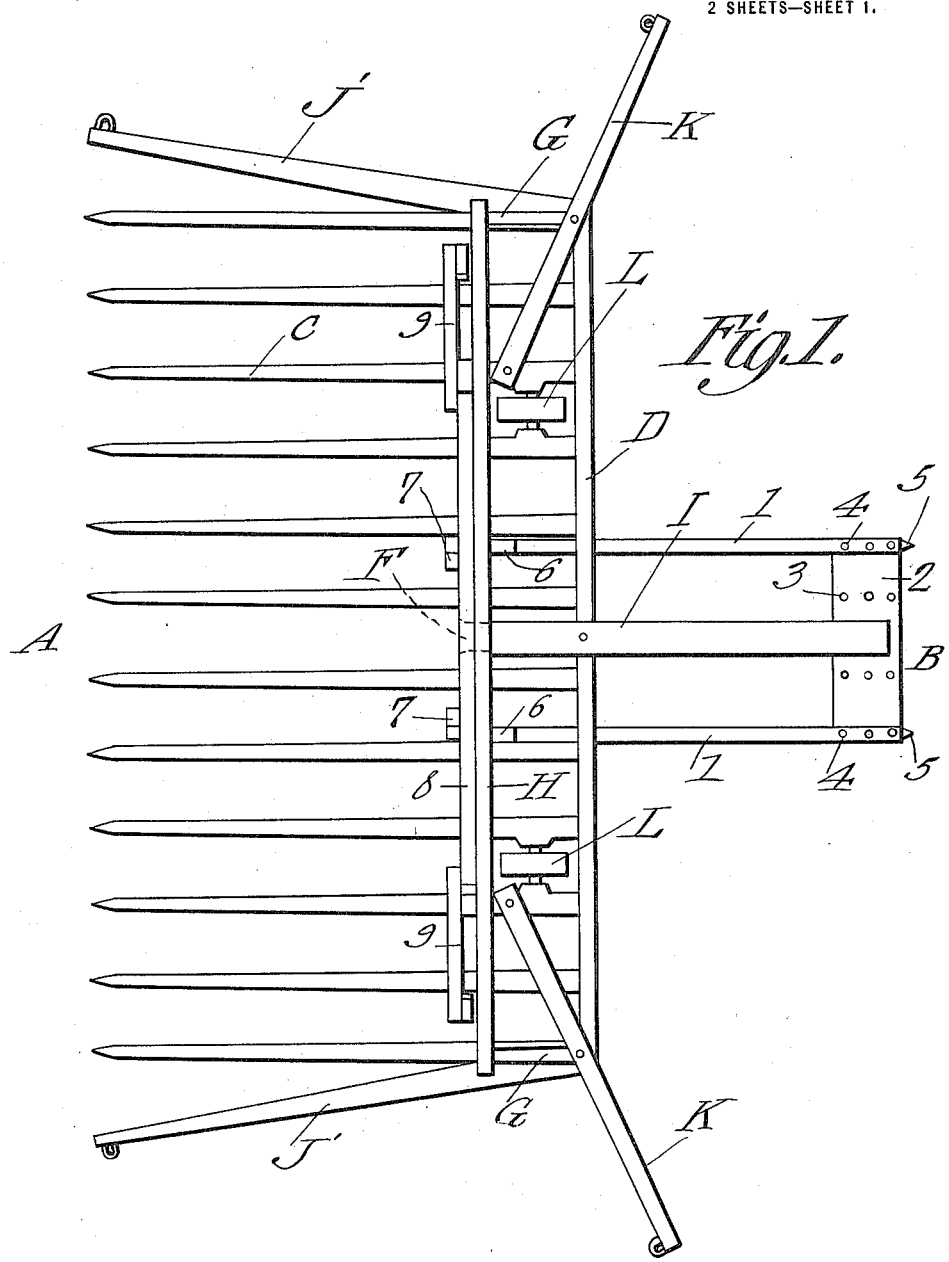
Figure 2:
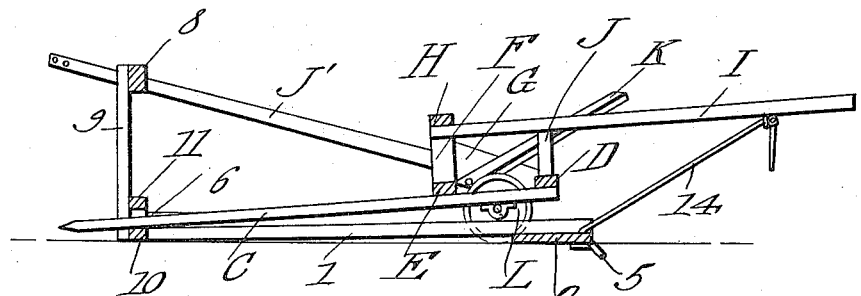
Figure 3:
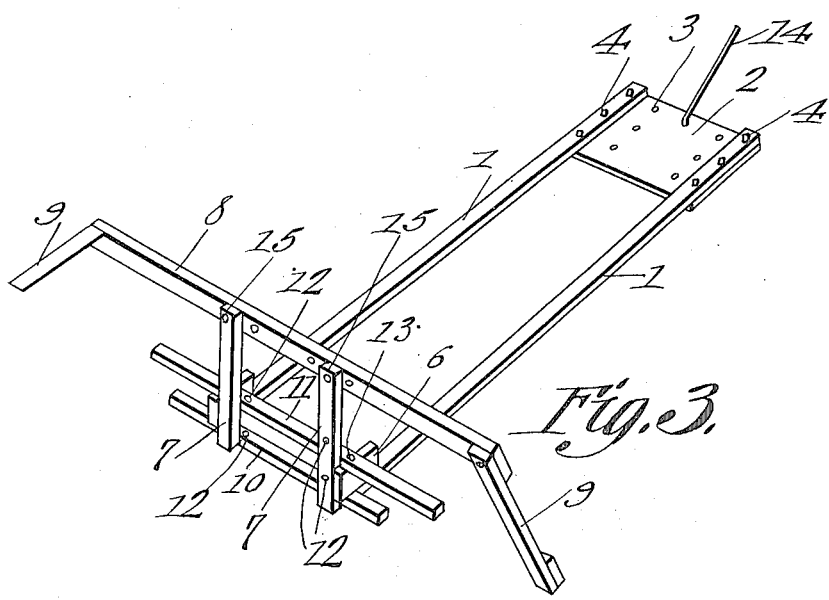

In said drawings:—Figure 1 is a plan view of a side hitch sweep rake having the present improvements combined therewith. Fig. 2 is a vertical longitudinal section therethrough, said section being taken on the line A—B Fig. 1, the attachment being shown projected forwardly on the rake. Fig. 3 is a perspective view of the attachment.

Referring to the figures by characters of reference C designates the tines of a rake, these tines being connected by a rear cross strip D and an intermediate cross strip E, said intermediate cross strip having an intermediate upstanding post F coöperating with side blocks G for supporting an upper cross strip H. A seat plank I is extended rearwardly from the middle portion of the strip H to which it is secured and bears downwardly on a supporting post J mounted on the intermediate portion of the rear strip D. Draft tongues $J^1$ are extended forwardly from the rear portions of the side tines C and are obliquely disposed. These tongues are arranged in front of beams K which are secured to the rear portion of the rake structure and extend laterally and rearwardly therefrom, the tongues $J^1$ and beams K having means whereby draft animals may be hitched thereto for the purpose of pulling the rake forwardly. Supporting wheels L may be mounted between certain of the tines C near the rear ends thereof for holding the rear portion of the rake off of the ground.

The structure hereinbefore described constitutes in itself no part of the present invention but is merely one form of standard make of rake with which the improvements constituting the present invention may be used.

As shown particularly in Fig. 3, the present invention includes parallel push bars 1 adjustably connected at their rear ends to a cross brace strip 2 having spaced series of openings 3 designed to receive fastening bolts 4 or the like. With this arrangement of bolts and apertures, it will be apparent that the push bars 1 can be adjusted toward each other.

The cross brace strip 2 is connected to the lower faces of the push bars 1 and has spurs or prongs 5 extending downwardly and rearwardly therefrom so that, when the attachment is moved forward, these spurs tend to drag over the ground whereas, when the attachment is pulled rearwardly, the spurs tend to dig into the ground and thus anchor the attachment.

Secured to and extending forwardly from the front ends of the push bars 1 are blocks 6. The two posts are connected to a cross bar 8 forming the upper member of the head of the attachment and the ends of this cross bar are provided with downwardly and outwardly inclined arms 9. The head of the attachment is completed by two cross strips 10 and 11, cross strip 10 extending under the blocks 6 while cross strip 11 extends over the block, both strips being adjustably connected to the blocks 6. The posts 7 are secured to these strips 10 and 11. These cross strips 10 and 11 are provided with series of openings 12 and fastening bolts 13 are adapted to extend downwardly through the strips 10 and 11 and the blocks for the purpose of holding the parts assembled. By utilizing a plurality of apertures 12, the blocks 6 and the bars 1 can be adjusted relative to each other at the front end of the attachment as well as at the rear end.

In using the attachment the same is placed in position with the center tines C extending between the strips 10 and 11, and the posts 7, the bars 1 projecting rearwardly below the spaces between these tines. The head of the attachment is normally positioned upon the rear portions of the tines so as to thrust rearwardly against the strip E and a rope 14 connects the brace strip 2 to the seat plank 1 and is of such length as to hang slack when the head of the attachment is in its normal position but to pull taut when said head arrives in position adjacent the points of the tines. It will be obvious that when the rake is pulled forwardly, the attachment will drag upon the ground and, consequently, the tines C will push forwardly within the head of the attachment and will gather the hay as ordinarily, the head of the attachment ultimately assuming a position against the cross strip E. After the rake has received a full load, the horses connected to the sides of the rake are backed. This causes the prongs C to dig into the surface of the ground and, consequently, the attachment will be anchored while the tines C are being pulled rearwardly. As the hay on the tines cannot move rearwardly with them because of the anchored head of the attachment, said hay will obviously be deposited on the ground. When the rope 14 becomes taut during this movement, it pulls upwardly on the rear end of the attachment, thus lifting the prongs or spurs 5 from the ground and allowing the entire structure, including the attachment to be moved rearwardly away from the deposited pile. After the pile has been properly cleared, the rake can be pulled forwardly as before and the foregoing operation repeated.

An examination of rakes of different types of construction will show that two general types are made. In one type the rake has a central tine, while in the other type two tines are located at the center, the center line of the rake intersecting the space between these two tines. In order that the present attachment may be adapted for use with rakes of either type, the push bars 1 have been adjustably connected so that they can be moved apart or brought together, thus to receive between them either one or two tines, according to the form of rake with which the attachment is used.

What is claimed is:—

A clearing attachment for rakes, including push bars, a cross brace adjustably connecting the rear ends of the bars, downwardly and rearwardly inclined anchoring means attached to said connecting brace, flexible means for attaching said connecting brace to the rear portion of a rake structure, blocks secured to the front ends of the push bars, parallel cross strips adjustably connecting the blocks at right angles to the push bars, said strips being superposed and forming a tine receiving space therebetween and between the blocks, posts connected to the respective strips, a cross strip adjustably connected to the posts, and depending arms carried by said strip, said posts, cross strips and arms constituting a head.

In testimony that I claim the foregoing as my own, I have hereto affixed my signature in the presence of two witnesses.

JOHN F. MERRELL.

Witnesses:
JOHN F. SHIBELY,
H. K. BRUCE.

Copies of this patent may be obtained for five cents each, by addressing the "Commissioner of Patents, Washington, D. C."